United States Patent [19]

Woodmas

[11] Patent Number: 5,345,592
[45] Date of Patent: Sep. 6, 1994

[54] SIGNAL TRANSFER AND POWER DELIVERY SYSTEM FOR A TELEVISION CAMERA STATION

[75] Inventor: Charles D. Woodmas, Lyndon, Kans.

[73] Assignee: Concept W Systems, Inc., Emporia, Kans.

[21] Appl. No.: 866,664

[22] Filed: Apr. 8, 1992

[51] Int. Cl.$^5$ .............................................. H04B 3/54
[52] U.S. Cl. ...................................... 455/3.3; 455/5.1; 340/310 A
[58] Field of Search ................... 358/86; 455/3.1, 3.3, 455/5.1, 6.3; 340/310 R, 310 A, 310 CP

[56] References Cited

U.S. PATENT DOCUMENTS

| | | | |
|---|---|---|---|
| 4,899,217 | 2/1990 | MacFadyen et al. | 358/86 |
| 5,032,820 | 7/1991 | Tanikawa et al. | 340/310 R |
| 5,033,112 | 7/1991 | Bowling et al. | 340/310 CP X |

*Primary Examiner*—Reinhard J. Eisenzopf
*Assistant Examiner*—Chi Pham
*Attorney, Agent, or Firm*—Hovey, Williams, Timmons & Collins

[57] ABSTRACT

A television production system provides both signaling and power over a single coaxial cable between a television control station and a remote camera station. The control station includes a power delivery unit for coupling with the coaxial cable for delivering D.C. voltage and current along with signaling over the coaxial cable. The camera station includes a power receiving unit which receives power from the coaxial cable and delivers it to the television camera and other camera station equipment. The receiving unit also monitors the received voltage and provides a power status signal representative thereof over the cable to the power delivery unit. The delivery unit controls the delivered voltage in accordance with the status signal in order to maintain the received voltage at the camera station at a desired level in order to compensate for cable voltage drop.

31 Claims, 5 Drawing Sheets

SIGNAL TRANSFER AND POWER DELIVERY SYSTEM FOR A TELEVISION CAMERA STATION

BACKGROUND OF THE INVENTION

1. Field of the Invention

The present invention relates to the field of television production using remotely located cameras. More particularly, the invention concerns a system for providing both signaling and power over a single coaxial cable between a television control station and a remote camera station and for controlling the voltage delivered to the camera station.

2. Description of the Prior Art

On-location production of television programs typically involves the use of a production control center housed in a trailer or van connected with a number of remote camera stations by way of control and power cables. Each camera station typically includes a camera, camera operator headset, talent earpiece, and talent microphone. The control cables must have the capability of carrying a wide variety of signals including camera video and program audio signals from the camera station to the control facility, and two-way intercom audio between the control facility and the camera operator and talent. The cables also carry various control signals from the control center to the camera station such as system master reference signals including color black and a composite video signal (black burst) used as a synchronizing signal (gen-lock), and an on-air tally signal which activates the tally light on the camera viewable by the talent as an on-air cue.

In one prior art cabling technique, a plurality of coaxial cables are used for carrying signals and power is provided to the camera station by a portable power generator or conventional drop cords connected to the nearest A.C. outlet. The number of individual cables required for this technique can range from two to a more common seven consisting of four audio twisted pairs and three coaxial cables plus a power cord. As those skilled in the art will appreciate, a seven-line bundle for one camera station weights about ninety pounds for a reach of three hundred fifty feet.

Another cabling technique uses a multi-conductor cable containing several narrow diameter mini-coaxial cables and several wire pairs for audio and power. A more recent development uses a triaxial cable in which video and audio signals are modulated and multiplexed along the center conductor and the intermediate conductor with power provided over the center and outer conductors.

As those skilled in the art appreciate, all of these prior art cabling techniques are expensive and the cabling is relatively heavy and stiff making it awkward to carry and route. An even more recent technique is called the CAMPLEX system and uses a single coaxial cable over which all of the signalling is modulated and multiplexed. Because only a single coaxial cable is used, the use of this system is inexpensive and the single cable is very easy to carry, route and splice. This system does require, however, a separate power supply such as a conventional drop cord or the use of camera's internal battery.

SUMMARY OF THE INVENTION

The signal transfer and delivery system of the present invention solves the prior art problems discussed above and provides a distinct advance in the state of the art. More particularly, the invention hereof provides both signalling and power over a single conductor pair.

Broadly speaking, the present invention includes respective control and remote station modules operable for transferring signals between a conductor pair. The control station module includes a power delivery unit for delivering power to the conductors; the remote station module includes a power reception unit for receiving power from the conductors and delivering power to the remote stations. The remote station module also includes means for sensing the status of the power at the remote station, for producing the power status signal representative of the power status and for transferring the status signal to the conductors. The power delivery unit includes means for receiving the status signal and for controlling the delivery of power accordingly to the conductors.

More particularly, the power status signal is representative of the D.C. voltage delivered to the power station. The power delivery unit controls the D.C. voltage delivered to the conductors in order to maintain the desired remote voltage despite variations in power consumption by the camera station and losses in the cable.

DETAILED DESCRIPTION OF THE PREFERRED EMBODIMENT

Figure 1:
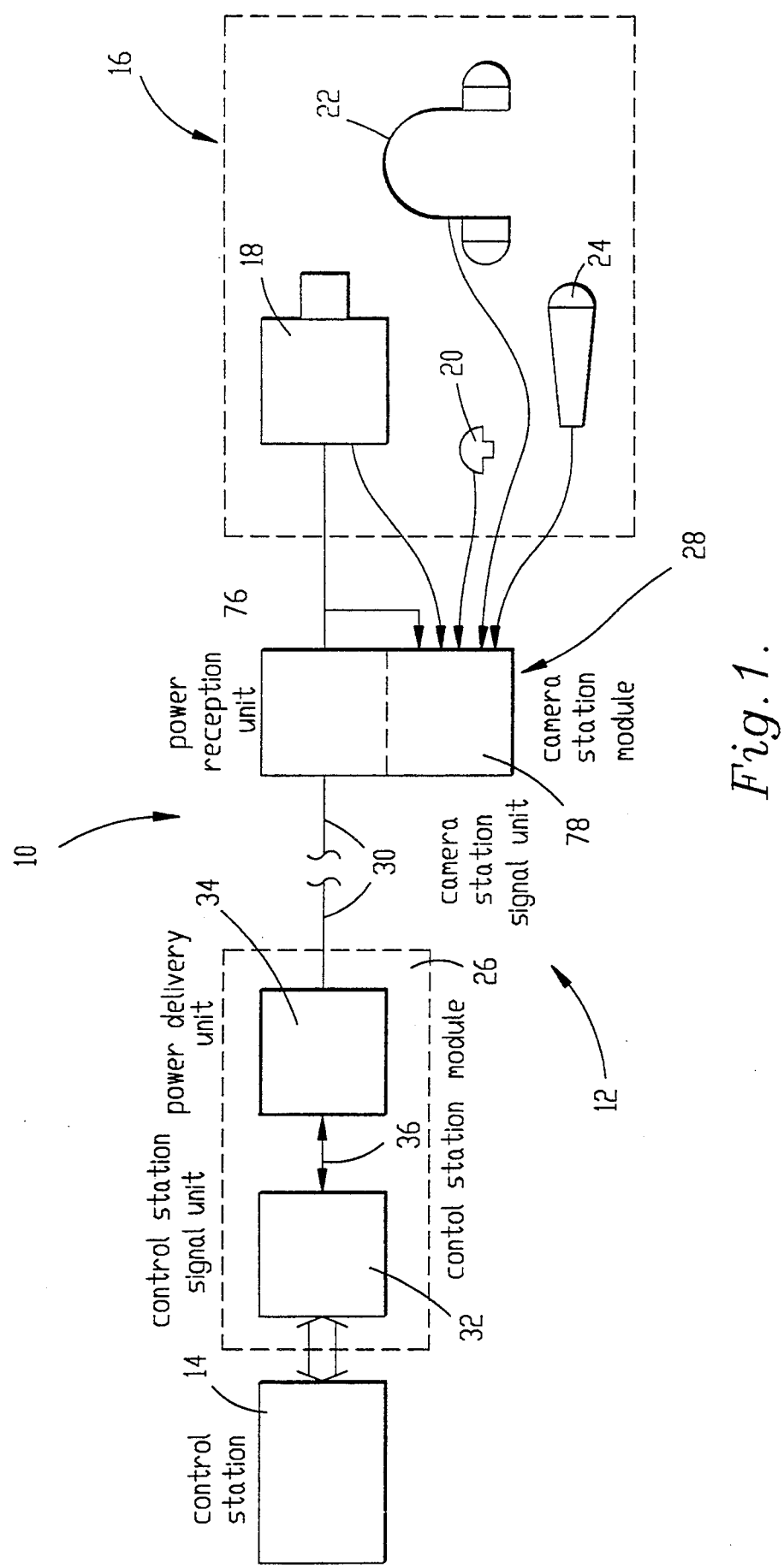
FIG. 1 is a schematic representation of a television production facility in accordance with the present invention.

FIG. 1 is a schematic representation of signal transfer and power delivery apparatus 10 illustrated as part of television production facility 12 which includes control station 14 and camera station 16. Control station 14 includes conventional television production equipment well known to those skilled in the art such as the production switcher, video and audio transmitters, camera monitors, preview monitors, program monitors, director's intercom, control signal generators, and control signal receivers. Camera station 16 is also conventional in nature and includes D.C. powerable video camera 18, talent earpiece 20, camera operator intercom headset 22, and talent microphone 24.

Apparatus 10 broadly includes control station module 26 and camera station module 28 interconnected by conventional 75-Ohm coaxial cable 30. Control station module 26 is also coupled with control station 14 for bi-directional signal transfer therewith, and camera station module 28 is coupled with components 18–24 of camera station module 16 also for bi-directional signal transfer therewith.

Control station module 26 includes control station signal unit 32 and power delivery unit 34. Signal unit 32 is preferably a conventional signal multiplexing unit such as a CAMPLEX console adaptor available from Concept W Systems, Inc. of Emporia, Kans. Signal unit 32 is operable to receive a plurality of signals from control station 14 and to combine and multiplex those signals onto coaxial cable portion 36 for transmission to camera station 16 by way of power delivery unit 34 and camera station module 28. Similarly, unit 32 is operable to receive multiplexed signals over cable portion 36 and to separate the signals for presentation to control station 14. In operation, preferred signal unit 32 imposes 12 VDC on line 36 when energized and imposes 24 VDC when activated for signal transfer. In the context of the present invention, these two voltages are used as signals indicative of the presence and signal operation of unit 32 as explained further herein.

Figure 2:
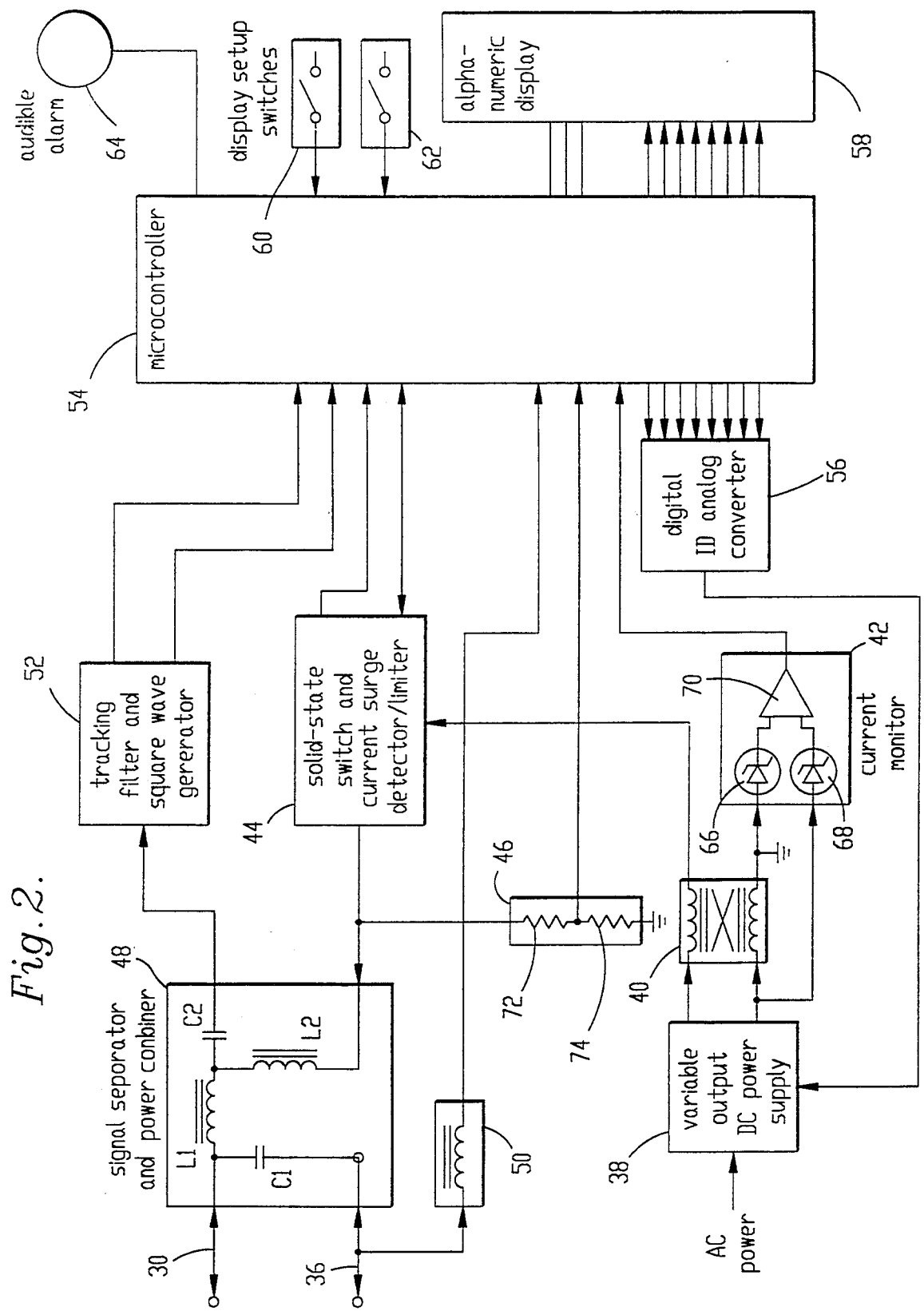
FIG. 2 is an electrical block diagram illustrating the power delivery unit of FIG. 1.

FIG. 2 illustrates power delivery unit 34 which, in general, delivers power in the form of D.C. voltage and current to cable 30 for transmission thereover to camera station module 28 which then separates the power from the signals for delivery to the appropriate components of camera station 16. Power delivery unit 34 includes variable output D.C. power supply 38, transformer 40, current monitor 42, solid state switch and current surge detector/limiter 44, voltage divider 46, signal separator and power combiner 48, RF choke 50, tracking filter and square wave generator 52, microcontroller 54, digital-to-analog converter (DAC) 56, alpha-numeric display 58, display setup switches 60 and 62, and audible alarm 64.

Power supply 38 (Vicor FlatPAC VI-LE4-CW) receives 120 VAC power from a conventional source thereof and delivers an output D.C. voltage to common mode transformer 40 (RENCO RL-1329-5-1000) used to remove high frequency noise from the output voltage. The output voltage from power supply 38 varies between about 15 and 48 volts in accordance with the analog signal received from DAC 56.

The input and output terminals of one leg of transformer 40 are coupled to the respective inputs of current monitor 42 which includes two reference diodes 66 and 68 (LM336) and operational amplifier 70 (NE5532). Diodes 66,68 provide calibrated voltage offsets to the inputs of amplifier 70. Monitor 42 detects the current flow from power supply 38 by monitoring the voltage drop across the monitored leg of transformer 40 and thereby provides an output voltage to microcontroller 54 between 0 and 5 VDC corresponding to a power supply output current flow between 0 and 2 amps.

Detector/limiter 44 receives the power flow from transformer 40 and provides two levels of current limiting. One level limits current to a low level at 15 milliamperes using two transistors conventionally configured as a constant current amplifier between the input and output. As explained further hereinbelow, this low level of output power is applied to cable 30 when power delivery unit 34 is initially energized. The second level of current limiting is for high level or operating power and conventionally includes a power field effect transistor (FET) (MTP8P10) used as a power switch and a second transistor (MPSA93) which monitors the voltage drop across a resistor in series with the FET power switch as a current limiter. Detector/limiter 44 receives a control input from microcontroller 54 which controls the on-off status of the power switch but which can be over-ridden by the second transistor. In this way, detector/limiter 44 presents a self-contained current limiter which prevents large current surges in the high power output as might be caused by a short in cable 30 as a result of being cut or pinched.

The output from detector/limiter 44 is coupled with voltage divider 46 and combiner 48. Voltage divider 46 is composed of series-coupled resistors 72 and 74 with the connection therebetween coupled with microcontroller 54 as an input thereto. The values of resistors 72,74 are selected so that one tenth of the output voltage from detector/limiter 44 is provided to microcontroller 54 as a representative signal thereof.

Signal separator and power combiner 48 includes inductors L1 and L2 and capacitors C1 and C2 interconnected as shown. Series connected inductor L1 and capacitor C2 form a low pass filter with an insertion-/isolation loss of about 10 dB at about 290 Khz which is the frequency of the power status signal received by combiner 48 over cable 30 from camera station module 28 as explained further hereinbelow. Capacitor C1 interconnects cable portion 36 and cable 30 for passing the various signals therebetween unaffected by the delivery of power to cable 30 by power delivery unit 34. Capacitor C1 forms a high pass filter with a 3 dB point at about 1.0 Mhz to isolate control station signal unit 32 from the power supplied to cable 30 by power delivery unit 34.

As mentioned above, signal unit 32 also provides two D.C. voltage outputs at 12 and 24 volts respectively corresponding to power-up and signal activation. Choke 50 interconnects cable portion 36 at combiner 48 and microcontroller 54 which allows the passage of these two voltages for monitoring by microcontroller 54 while preventing passage of the RF signals passing between control station and camera station 16. As explained further hereinbelow, microcontroller 54 monitors these two voltages provided by unit 32 in order to test for the presence and activation thereof.

Tracking filter and square wave generator 52 is a combination of a conventional phase locked loop (PLL) (EXAR XR-2211), voltage comparator and binary ripple counter. Generator 52 receives the power status signal as an input from combiner 48. In turn, generator 52 provides two outputs, the first is in the form of a "signal valid" output which indicates the presence of the status signal to microcontroller 54.

The second output is in the form of a reduced frequency square wave representative of the frequency of the input signal. This frequency represents the voltage provided to camera station 16 by camera station module 28 and is used by microcontroller 54 to control the output voltage delivered to cable 30 by power delivery unit 34. The conventional PLL is configured to operate as a tracking filter tuned to lock to the status signal which typically presents a frequency range from 250 to 300 Khz. The output from the tracking filter's oscillator is provided as the input to a voltage comparator (LM393) which converts the input to an output square wave.

Passage through the tracking filter and comparator also provides selected amplification, removes spurious signals, and provides a logic level square wave signal to the binary ripple counter (CD4024). This ripple counter serves as a frequency divider (divide by 64) providing a lower frequency square wave as an input to microcontroller 54 which still retains the frequency variations of the input signal. The tracking filter also provides the "signal valid" output which is the "lock detect" output therefrom.

Microcontroller 54 (Motorola MC68705R3), in addition to the connections mentioned above, is also connected to audible piezo alarm 64, to switches 60,62, and to display 58 (available from Industrial Electronic Engineers, Inc. LCM-2006) as illustrated in FIG. 2. The operation of components 58-64 is explained further hereinbelow in connection with the flowcharts of FIGS. 4A,B.

Cable 30 interconnects control station module 26 with camera station module 28 for bi-directional signal transfer therebetween and for delivery of power from power delivery unit 34. Camera station module 28 separates the power from the signals on cable 30 and delivers the power to camera station 16 for operational use. Camera station module 28 includes power reception unit 76 and camera station signal unit 78. The preferred camera station signal unit is the CAMPLEX camera adaptor available from Concept W Systems, Inc. of Emporia, Kans. with the circuitry of power reception unit 76 integrated therewith to form a single integrated unit.

Figure 3:
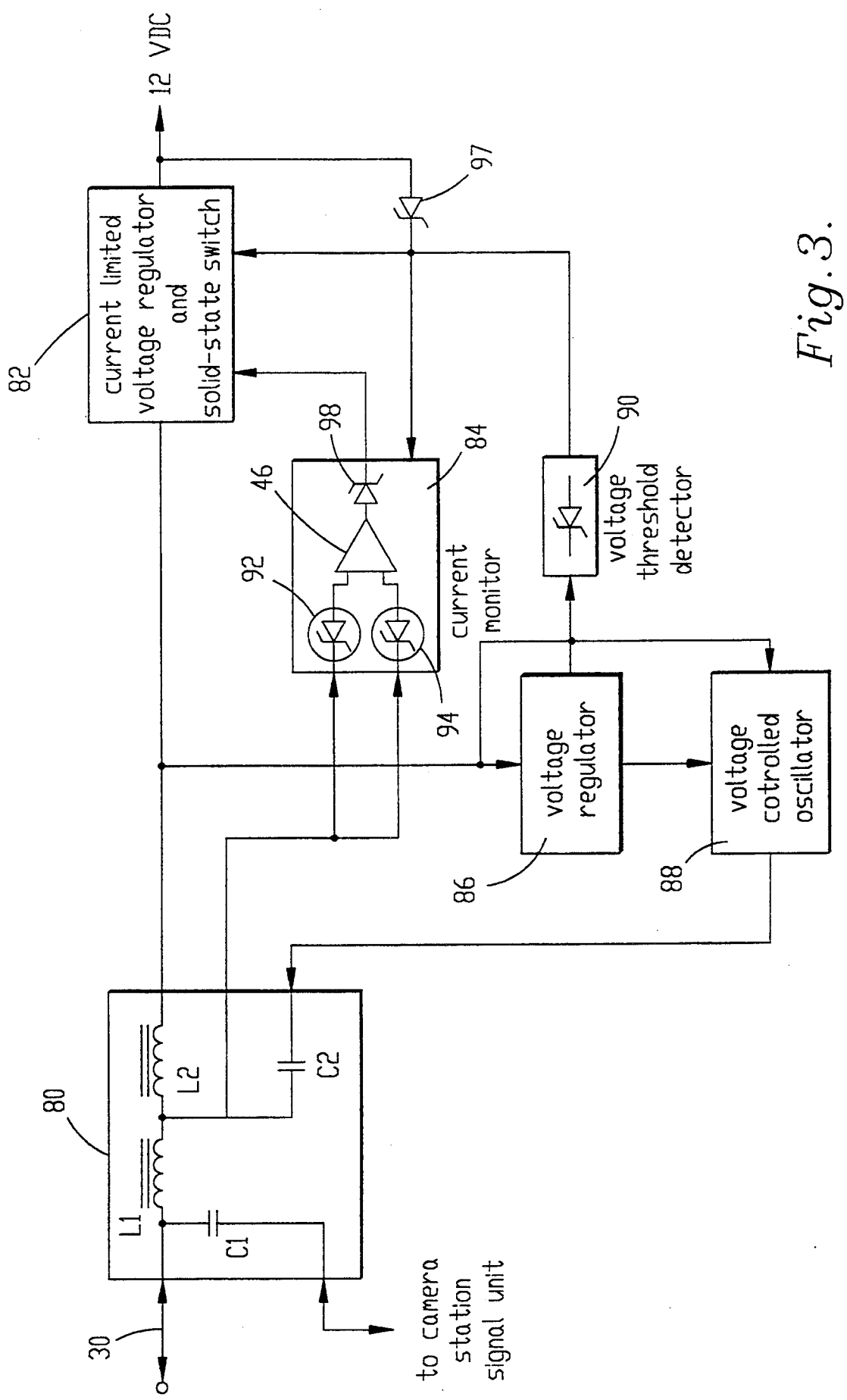
FIG. 3 is an electrical block diagram illustrating the power reception unit of FIG. 1.

FIG. 3 is an electrical block diagram illustrating power reception unit 76 which includes signal combiner and power separator 80, current limited voltage regulator 82, current monitor 84, voltage regulator 86, voltage controlled oscillator 88 and voltage threshold detector 90.

Separator 80 includes inductors L1 and L2 and capacitors C1 and C2 interconnected as shown. Capacitor C1 presents a high pass filter with a 3 dB point at about 1 Mhz and thereby prevents passage of the D.C. power voltage to camera station signal unit 78 but allows bi-directional passage of the high frequency signals between cable 30 and signal unit 78. In contrast, series coupled inductors L1,L2 prevent passage of the high frequency signals but allow passage of the D.C. power as an output to regulators 82 and 84 as shown in FIG. 3.

Conventional regulator 82 receives the power input from separator 80 and provides a current limited output at about 12 VDC to camera station 16 and in particular to camera 18. Regulator 82 uses a power field effect transistor controlled by current monitor 84 to limit current throughput. More particularly, regulator 82 includes a zener-diode referenced operational amplifier (NE5534) which functions as a power output voltage error amplifier controlling a power field effect transistor (MTP8P10) which functions as a series regulator.

Regulator 82 is controlled by two signals. The first signal is a power control signal received from voltage threshold detector 90 which enables operation of the error amplifier and causes regulated power to pass through the transistor. The second signal is a current control signal that controls a second transistor to override the error amplifier output and thus controls the current through the power transistor.

Current monitor 84 generates a control signal used to activate the current limiting function of regulator 82. Monitor 84 includes zener diodes 92 and 94 (LM336) the anodes of which are connected to the input terminals of operational amplifier 96 (NE5230). The anode of output zener diode 98 (5.6 volts) is connected to the output of amplifier 96 and the cathode of diode 98 is connected to regulator 82 as a current control input thereto. The cathodes of diodes 92,96 are connected across inductor L2 of separator 80 to detect the current-induced voltage drop thereacross. The gain and offset of amplifier 96 is calibrated such that a voltage drop across inductor L2 equivalent to 2.0 amperes causes output diode 96 to conduct and thereby enable the current limiting function of regulator 82. Power control diode 97 interconnects the output of regulator 82 with current monitor 84 at the power control terminal thereof and with the output of threshold detector 90. Diode 97 holds monitor 84 and voltage regulator 82 in a power-on state after the power input voltage is adjusted down to its normal level of 15 VDC.

Voltage threshold detector 90 comprises a zener diode having the cathode coupled with the input to regulator 82 and having the anode thereof coupled to the power control terminal of regulator 82. Detector 90 prevents regulator 82 from supplying an output voltage until the input voltage rises above a threshold level of 24 VDC.

Voltage regulator 86 includes two transistors configured as a constant current amplifier between the power input and a zener diode coupled to ground at the power output. Regulator 86 provides a clean and stable operating power supply to oscillator 88 at the power-in terminal thereof.

Voltage controlled oscillator 88 (EXAR XR-2206) generates the power status signal as a frequency modulated signal between 250 and 350 Khz in accordance with the voltage applied to the control-voltage-in terminal corresponding to a range of 15 to 50 VDC. The voltage applied to this terminal is the D.C. voltage provided by separator 80 which in turn is the power voltage as received from power delivery unit 34. In this way, the frequency of the power status signal represents the voltage as delivered by cable 30 to camera station module 28. As those skilled in the art will appreciate, the delivered voltage can vary according to the power draw of camera station 16 and the length of cable 30. The power status signal represents the actual delivered voltage which is used by power delivery unit 34 to compensate.

The power status signal produced by oscillator 88 is coupled to cable 30 by way of inductors L1 and capacitor C2 which form a low pass filter with an insertion-/isolation loss of about 10 dB at the frequency of the status signal. With this configuration of power reception unit 76, the status of the delivered power, that is, the D.C. voltage thereof is sensed and a representative power status signal in the form of a frequency modulated signal is transferred to cable 30.

Figure 4A:
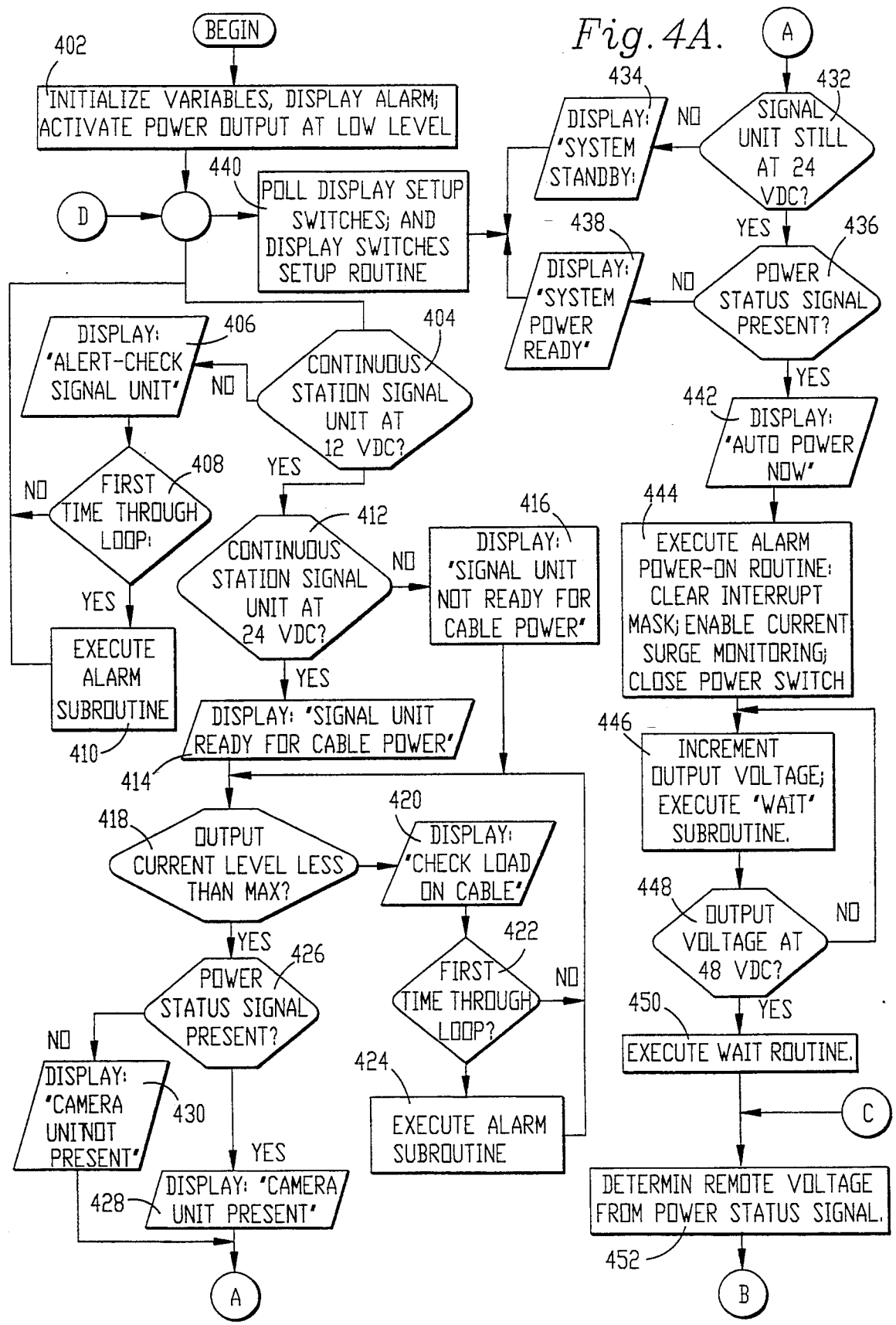
FIG. 4A is a computer program flow chart illustrating the operation of the microcontroller of FIG. 2.

FIGS. 4A,B are computer program flowcharts illustrating the program for operating microprocessor 54. On power-up, the program enters at step 402 which initializes the software variables, inputs and outputs, display 58 and alarm 64. This step also activates power delivery unit 34 to deliver a low level voltage to cable 30 at 15 VDC limited to 15ma. To accomplish this, microcontroller 54 presents the appropriate binary code to DAC 56 which, in turn, produces an analog output to power supply 38 for producing the output at 15 VDC. This low level is delivered to cable 30 by way of transformer 40, detector/limiter 44 and combiner 48. Detector/limiter 44 limits the output current to 15ma. By limiting the output current to 15 ma, a short circuit in cable 30 causes the voltage thereon to drop from the nominal 15 VDC which is detected by voltage divider 46. When the voltage drops below 10 VDC, as represented by the signal delivered to microcontroller 54, a short circuit is indicated as discussed further hereinbelow.

Step 404 then asks whether control station signal unit 32 is producing an output at 12 VDC as received by microcontroller 54 by way of cable portion 36 and choke 50. As explained above, when control station signal unit 32 is initially energized, that is, powered up, it produces an output at 12 VDC. This output is used by the program to determine whether signal unit 32 is present and powered.

If the answer in step 404 is no, step 406 activates display 58 to display the message "alert-check signal unit." Step 408 then asks whether this is the first time through this portion of the program, and if yes step 410 initiates execution of a conventional alarm subroutine for activating audible alarm 64. The display and audible alarm serve as a prompt to check the status of signal unit 32. If the answer in step 408 is no, this indicates that the alarm subroutine was previously initiated and step 410 can be skipped. The program continues to loop through steps 404-410 until the presence of signal unit 32 is indicated by a yes answer in step 404.

Step 412 then asks whether signal unit 32 is producing an output voltage at 24 VDC indicating activation thereof for signal transfer. If yes, step 414 initiates display of the message "signal unit ready for cable power." If the answer in step 412 is no, step 416 activates display 58 for the message "signal unit not ready for cable power."

After low level power output is initiated, step 418 then asks whether the current output is less than the maximum allowable as indicated by the voltage signal received by microcontroller 54 from voltage divider 46. By limiting the output current to 15 ma., a short circuit in cable 30 causes a voltage drop which can be detected safely before full operating power is imposed. As those skilled in the art will appreciate, a short circuit may result if cable 30 is pinched or cut, but may also occur if the equipment at the remote end of cable 30 is defective or improperly connected.

If the answer in step 418 is no, indicating that a short circuit does exist, step 420 initiates display of the message "check load on cable." Step 422 then asks whether this is the first time through this loop of the program. If yes, step 424 initiates the alarm subroutine. If the answer in step 422 is no, or after step 424, the program loops back to step 418 and continues through steps 418-424 until the problem is corrected.

If the test in step 418 is passed, step 426 then asks whether the power status signal is present as detected by tracking filter and square wave generator 52. The presence of the status signal is provided to microcontroller 54 from the "signal valid" terminal of generator 52. When low level power is imposed on cable 30 and power reception unit 76 is present and operational, oscillator 88 (FIG. 3) senses the low level voltage delivered to reception unit 76, produces the power status signal representative of the low level voltage and returns the signal by way of cable 30 back to delivery unit 34. In this way both the presence and functionality of power delivery unit 76 are checked before full power is imposed on cable 30.

If the power status signal is present, step 428 initiates display of the message "camera unit present." If the answer in step 426 is no, step 430 initiates display of the message "camera unit not present."

After steps 428 and 430, step 432 asks whether the voltage signal from camera station signal unit 32 is still at the high level voltage of 24 VDC. If no, the message "system standby" is displayed indicating that power delivery unit 34 is ready to deliver power. If the answer in step 432 is yes, step 436 again asks whether the power status signal is present. If no, step 438 displays the message "system power ready." After steps 434 or 438, step 440 polls setup switches 60,62 and in response, executes the "display menu setup" routine. More particularly, successive activation of "select" switch 60 causes display 58 to successively display the five bar-graph menu options of voltage bar graph on, off, current bar graph on, off or the combination voltage and current bar graph. When the desired menu option is displayed, activation of "enter" switch 62 selects the display bar graph option for display. The program then loops back to step 404.

If the answer in step 436 is yes, then it is known that both control station signal unit 32 and power reception unit 76 are ready for full power operation. Step 442 then displays the message "auto power now." Step 444 then executes the alarm power-on routine and clears the interrupt mask. Step 444 also enables the current surge monitoring by detector/limiter 44 by providing an input to the power control terminal thereof from microcontroller 54. This action also closes the power transistor and detector/limiter 44 which delivers full power output to cable 30.

Initially full power output is imposed at the lower end of the allowable range (between about 15 and 50 VDC) and step 446 then increments the output voltage by incrementing the binary code delivered to DAC 56. The program then executes a standard wait subroutine then asks in step 448 whether the output voltage as delivered to cable 30 is at 48 VDC. If no, the program continues to loop through steps 446 and 448, incrementing the voltage each time until 48 VDC is achieved taking about one fourth second to bring the voltage up to this level. When this occurs, step 450 again executes the wait routine to allow the voltage to stabilize at power reception unit 76.

During this time, the solid state switch of regulator 82 (FIG. 3) is open and no power output is provided until the voltage reaches 24 VDC. At this point voltage threshold detector 90 activates regulator 82 which begins producing an output at 12 VDC. In turn, this output latches in current monitor 84 and regulator 82 by way of diode 97. In step 452, microcontroller 54 then reads the power status signal as presented by generator 52 from the square wave output terminal thereof. In other words, in this step the program determines the voltage as present at power reception unit 76.

Figure 4B:
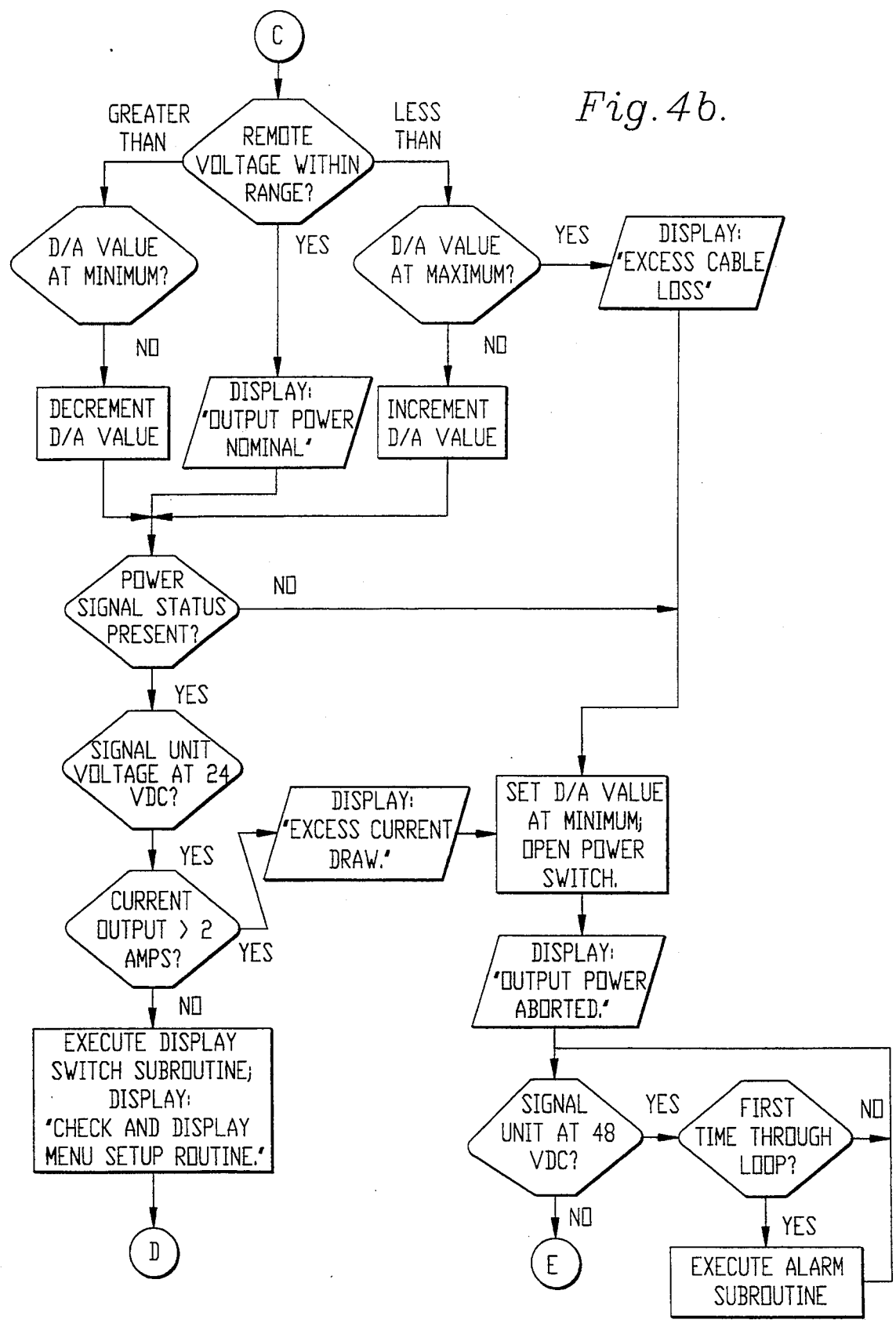
FIG. 4B is a continuation of the computer program flow chart of FIG. 4A.

The program next moves to step 454 in FIG. 4B which asks whether the voltage as received by power reception unit 76 is within the allowable range. A range is provided as a so-called "dead band" to keep the program from "hunting." If the answer in step 454 is yes, the program moves to step 456 which displays the message "output power nominal."

If the received voltage is greater than the allowable range, step 458 asks whether the binary value to DAC 56 is already at its allowable minimum. If no, step 460 decrements the binary value.

If step 454 indicates that the received voltage is less than the range, step 462 asks whether the binary value presented to DAC 56 is already at its maximum. If no, step 464 increments this binary value to increase the voltage.

If the answer in step 458 is yes, or after steps 460, 456 or 464, step 456 asks whether the power status signal is still present as indicated by the "single valid" output on generator 52 (FIG. 2). If yes, step 468 then asks whether control station signal unit 32 is still activated as indicated by its voltage output signal at 24 VDC.

If the answer in step 468 is yes, step 470 then reads the current output as represented by the signal from current monitor 42 and asks whether this value is greater than the allowable two amps. If the current flow is below this allowable limit, the answer in step 470 is no and step 472 then polls switches 60,62 and executes the display menu setup routine as discussed in connection with step 440. The program then loops back to step 452 (FIG. 4A) for continued monitoring of received voltage and allowable current limits.

If the answer in step 462 is yes, indicating that the binary value delivered to DAC 56 is already at its maximum value, then step 474 displays the message "excess cable loss." In other words, if power delivery unit 34 is delivering its maximum output voltage but the voltage as received by power reception unit 76 is still less than the desired range, then a problem is indicated most likely caused by excess cable length in combination with excessive current draw by camera 18.

If such is the case, then operation should not continue and step 476 resets the binary value presented to DAC 56 and shuts off the output power by deactivating the signal from microcontroller 54 to the power control terminal of detector/limiter 44. A problem is also indicated and step 476 is executed if the power status signal disappears as indicated by no answer in step 456, or if the high level voltage signal from control station signal unit 32 disappears as indicated by a no answer in step 468.

Similarly, if the answer in step 470 is yes indicating an excess current draw, step 478 displays the message "excess current draw" and the program again moves to step 476 to shut off power output. After step 476, the program moves to step 480 which displays the message "output power aborted."

Step 482 next asks whether control station signal unit 32 is still providing its output voltage signal indicating activation. If yes, step 484 asks whether this is the first time through this loop of the program. If the answer to this step is yes, step 486 then executes the alarm subroutine to activate audible alarm 64. If the answer in step 484 is no, or after step 486, the program loops back to step 482.

If the answer in step 482 is no, indicating that control station signal unit 32 is not active, the program loops back to step 404 (FIG. 4A) to reinitiate the start-up process.

Those skilled in the art will appreciate that the present invention encompasses many variations in the preferred embodiment described herein. For example, a two wire pair may be used instead of the preferred coaxial cable in some circumstances. The preferred power status signal could also represent actual power flow or current flow. As a final example, the present invention also presents utility for signalling and power delivery in applications other than the preferred television production environment.

Having thus described the preferred embodiment of the present invention, the following is claimed as new and desired to be secured by Letters Patent:

1. An apparatus for transferring video, audio or control signals between a control station and a remote station and for providing operating power to the remote station over a pair of conductors, said apparatus comprising:
   control station signal means including means for coupling with the control station and with the conductors for transferring signals therebetween;
   remote station means including means for coupling with the remote station and with the conductors for transferring signals therebetween; and
   power delivery means, including means for coupling with the conductors, for delivering power from a source thereof to the conductors,
   said remote station means including power reception means for receiving said power from the conductors and for delivering said power to the remote station, and for sensing the status of said power at said remote station means, for producing a power status signal representative of said status, and for transferring said status signal to the conductors,
   said power delivery means including means for receiving said status signal and for controlling the delivery of said power in accordance therewith;
   said power status signal being representative of a D.C. voltage received at said remote station means as delivered by said power delivery means.

2. The apparatus as set forth in claim 1, said conductors being configured as a coaxial cable.

3. The apparatus as set forth in claim 1, said power delivery means including means for delivering power in the form of D.C. voltage and current.

4. The apparatus as set forth in claim 1, said power delivery means including means for varying the D.C. voltage delivered to the conductors in accordance with said status signal in order to maintain the D.C. voltage as received at said remote station.

5. The apparatus as set forth in claim 3, said power reception means including means for producing said status signal as an A.C. signal which varies in frequency in accordance with said received D.C. voltage.

6. The apparatus as set forth in claim 5, said status signal producing means including a voltage controlled oscillator.

7. The apparatus as set forth in claim 1, the remote station including a television camera, said power receiving means including means for delivering operating power to the camera.

8. The apparatus as set forth in claim 1, said power delivery means including means for monitoring current flow delivered to said conductors and for limiting said current flow to a predetermined level.

9. An apparatus for transferring video, audio or control signals between a control station and a remote station and for providing operating power to the remote station over a pair of conductors, said apparatus comprising:
   control station signal means including means for coupling with the control station and with the conductors for transferring signals therebetween;
   remote station means including means for coupling with the remote station and with the conductors for transferring signals therebetween; and
   power delivery means, including means for coupling with the conductors, for delivering power from a source thereof to the conductors,
   said remote station means including power reception means
      for receiving said power from the conductors and for delivering said power to the remote station, and
      for sensing the status of said power at said remote station means, for producing a power status signal representative of said status, and for transferring said status signal to the conductors,
   said power delivery means including means for receiving said status signal and for controlling the delivery of said power in accordance therewith, said power delivery means including means for delivering power at a first level and at a second reduced level, for initially delivering said power at a reduced level, and for testing for excessive current flow in the conductors at said reduced level before delivering power at said first level.

10. The apparatus as set forth in claim 9, said power delivery means including means for detecting said status signal during delivery power at said reduced level and for preventing delivery of power at said first level in the absence of said status signal.

11. The apparatus as set forth in claim 9, said control station signal means including means for producing a station signal for delivering said station signal to said delivery means, said power delivery means including means for receiving said station signal and for preventing production at said first power level in the absence of said station signal.

12. The apparatus as set forth in claim 9, said power delivery means including means for delivering said power in the form of D.C. voltage and current, said first and second levels being respective levels of D.C. voltage.

13. The apparatus as set forth in claim 12, said power reception means including means for preventing delivery of output power therefrom until the voltage received thereat exceeds said second reduced level.

14. The apparatus as set forth in claim 9 said conductors being configured as a coaxial cable.

15. The apparatus as set forth in claim 9, said power delivery means including means for delivering power in the form of D.C. voltage and current.

16. The apparatus as set forth in claim 9, the remote station including a television camera, said power receiving means including means for delivering operating power to the camera.

17. The apparatus as set forth in claim 9, said power delivery means including means for monitoring current flow delivered to said conductors and for limiting said current flow to a predetermined level.

18. An apparatus for transferring video, audio or control signals between a control station and a television camera station and for providing operating power to the camera station by way of a coaxial cable, said apparatus comprising:
a control station module including means for coupling with the control station and with the cable including
control station signal means for transferring signals between the control station and the cable,
power delivery means for delivering power in the form of D.C. voltage and current from a source thereof to the cable; and
a camera station module including means for coupling with the cable and with the camera station including
camera station signal means for transferring signals between the camera station and the cable; and
power reception means for receiving said power from the cable and for delivering said power to the camera station.
said power reception means including voltage sensing and signal means for sensing the voltage of said power delivered to said camera station, for producing a power status signal representative of said voltage, and for transferring said status signal to said cable,
said power delivery means including voltage control means for receiving said status signal and for controlling said delivery of power in accordance therewith for maintaining said voltage delivered to said camera station at a predetermined level despite variations in power consumption by said camera station and losses in the cable,
said power reception means including means for producing said status signal as an A.C. signal which varies in frequency in accordance with said received D.C. voltage.

19. The apparatus as set forth in claim 18, said status signal producing means including a voltage controlled oscillator.

20. The apparatus as set forth in claim 18, said power delivery means including means for monitoring current flow delivered to the cable and for limiting said current flow to a predetermined level.

21. The apparatus as set forth in claim 18, said power delivery means including means for delivering power at a first and at a second reduced level, for initially delivering said power at said reduced level, and for detecting said status signal during delivery power at said reduced level and for preventing delivery of power at said first level in the absence of said status signal.

22. An apparatus for transferring video, audio or control signals between a control station and a television camera station and for providing operating power to the camera station by way of a coaxial cable, said apparatus comprising:
a control station module including means for coupling with the control station and with the cable including
control station signal means for transferring signals between the control station and the cable,
power delivery means for delivering power in the form of D.C. voltage and current from a source thereof to the cable; and
a camera station module including means for coupling with the cable and with the camera station including
camera station signal means for transferring signals between the camera station and the cable; and
power reception means for receiving said power from the cable and for delivering said power to the camera station,
said power reception means including voltage sensing and signal means for sensing the voltage of said power delivered to said camera station, for producing a power status signal representative of said voltage, and for transferring said status signal to said cable,
said power delivery means including voltage control means for receiving said status signal and for controlling said delivery of power in accordance therewith for maintaining said voltage delivered to said camera station at a predetermined level despite variations in power consumption by said camera station and losses in the cable,
said power delivery means including means for delivering power at a first level and at a second reduced level, for initially delivering said power at a reduced level, and for testing for excessive current flow in the cable at said reduced level before delivering power at said first level.

23. The apparatus as set forth in claim 22, said power delivery means including means for detecting said status signal during delivery power at said reduced level and for preventing delivery of power at said first level in the absence of said status signal.

24. The apparatus as set forth in claim 22, said control station signal means including means for producing a station signal for delivering said station signal to said delivery means, said power delivery means including means for receiving said station signal and for preventing production at said first power level in the absence of said station signal.

25. The apparatus as set forth in claim 22, said power delivery means including means for delivering said power in the form of D.C. voltage and current, said first and second levels being respective levels of D.C. voltage.

26. The apparatus as set forth in claim 25, said power reception means including means for preventing delivery of output power therefrom until the voltage received thereat exceeds said second reduced level.

27. The apparatus as set forth in claim 22, said power delivery means including means for monitoring current flow delivered to the cable and for limiting said current flow to a predetermined level.

28. The apparatus as set forth in claim 22, said power delivery means including means for delivering power at a first and at a second reduced level, for initially delivering said power at said reduced level, and for detecting said status signal during delivery power at said reduced level and for preventing delivery of power at said first level in the absence of said status signal.

29. A method of transferring audio or control signals between a control station and a television camera station and for providing operating power to the camera station by way of a coaxial cable, said method comprising steps of:
   transferring signals between the control station and the cable:
   using a power delivery unit for delivering power as delivered power in the form of D.C. voltage and current from a source thereof to the cable;
   transferring signals between the camera station and the cable;
   receiving said power as received power from the cable and delivering said power to the camera station,
   sensing the voltage of said received power as received voltage;
   producing a power status signal representative of said received voltage;
   transferring said status signal to the cable; and
   receiving said status signal from the cable into said power delivery unit and controlling said delivered voltage in accordance with said status signal for maintaining said received voltage at a predetermined level in order to compensate for voltage drop in said cable,
   further including the steps of initially delivering power at said delivery unit at said reduced voltage,
   testing for excess current flow into said cable from said power delivery unit at said reduced voltage, and
   preventing delivery of power at an operational level of voltage higher than said reduced voltage upon the occurrence of said excess current flow.

30. The method as set forth in claim 29 further including the steps of
   initially delivering power from said delivery unit at a reduced voltage,
   testing for reception of said status signal at said reduced voltage, and
   preventing delivery of power at an operational level of voltage higher than said reduced voltage in the absence of said status signal during delivery at said reduced voltage.

31. The method as set forth in claim 29 further including the steps of
   testing for reception of said status signal at said reduce voltage, and
   preventing delivery of power at said operational level in the absence of said status signal.

* * * * *